Aug. 26, 1941.   D. H. MITCHELL   2,253,572
CONVEYER
Filed Aug. 26, 1939   2 Sheets-Sheet 1

INVENTOR
D. H. MITCHELL
BY E. R. Nowlan
ATTORNEY

Aug. 26, 1941.  D. H. MITCHELL  2,253,572
CONVEYER
Filed Aug. 26, 1939  2 Sheets-Sheet 2

INVENTOR
D. H. MITCHELL
BY E. R. Nowlan
ATTORNEY

Patented Aug. 26, 1941

2,253,572

UNITED STATES PATENT OFFICE 2,253,572

CONVEYER

Donald H. Mitchell, Newark, N. J., assignor to Western Electric Company, Incorporated, New York, N. Y., a corporation of New York Application August 26, 1939, Serial No. 292,047

6 Claims. (Cl. 198—38)

This invention relates to conveyers, and more particularly to conveyers of the selector type for conveying containers for articles to selected stations.

An object of the invention is to provide a simple, efficient and practical conveyer of the automatic selector type.

With this and other objects in view, the invention comprises a conveyer having associated conveyer units to transport a container for articles to any of the multiplicity of locations by selectively locating contacts on the container to actuate certain selector elements as the container approaches a conveyer unit on which it is to be deflected, to move a deflector arm in position, where it is automatically latched until the container is deflected, at which time the deflector arm is released, the locking of the selector elements against operation providing means to stop the container at any selected position.

Figure 1:
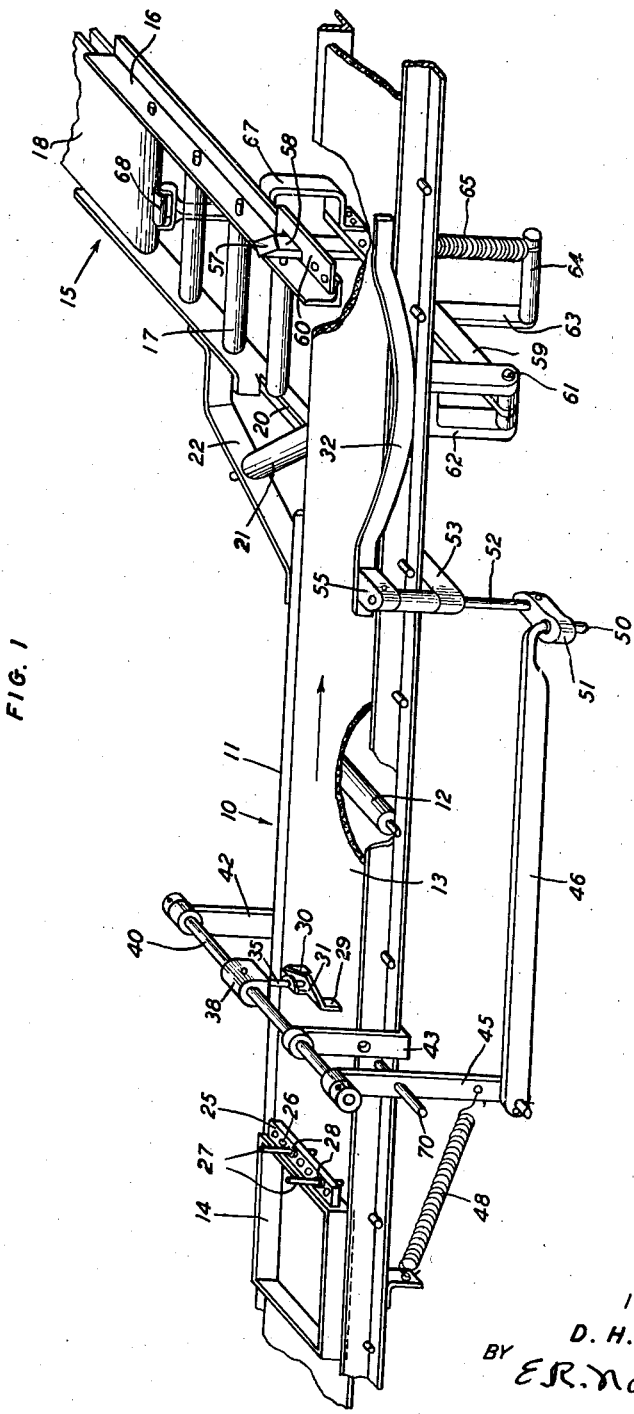
Figure 3:
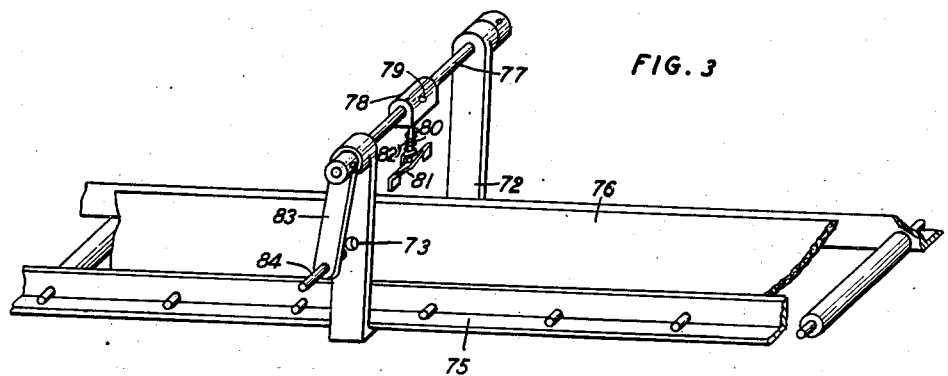
Figure 2:
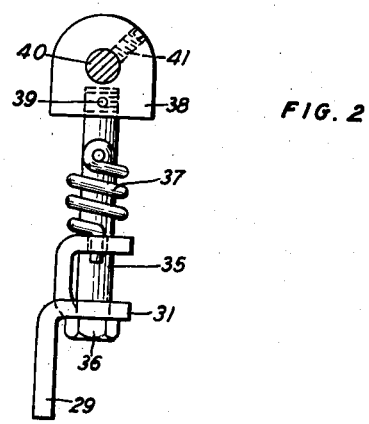

Other objects and advantages will be apparent from the following detailed description when taken in conjunction with the accompanying drawings, wherein Fig. 1 is a fragmentary perspective view of a portion of a conveyer system illustrating the invention;

Fig. 2 is an enlarged side elevational view of one of the selector elements, and Fig. 3 is a fragmentary perspective view of a portion of the conveyer mechanism.

Referring now to Fig. 1 of the drawings, numeral 10 designates generally a conveyer unit which, in the present instance, has a frame 11 rotatably supporting rollers 12 over which an endless conveyer belt 13 travels. The conveyer belt 13 is caused to travel in the direction of the arrow by any suitable driving means. The frame 11 may be mounted upon legs or any other suitable supporting means, the sides of the frame being angular in cross section and extending above the conveyer belt to serve as guides for containers such as the one illustrated at 14. Other conveyer units, such as that indicated generally at 15, may be associated with the conveyer unit 10 to transport containers to any desired position or station. The conveyer unit 15 has a frame 16 similar in structure to the frame 11, having side angle members to rotatably support rollers 17 upon certain of which an endless belt 18 travels to continue the movement of the container. Should it be desirable to discontinue the travel of the container after it has been removed from the conveyer 10 the endless belt 18 is not needed, the rollers 17 serving as supports for the container.

In order that the container may travel from the conveyer 10 to the conveyer 15 the portion of the frame 11 at the juncture of the two conveyers is cut away and the frame 16 of the conveyer 15 is constructed to allow an arcuate movement of the container from the conveyer 10 to the conveyer 15. One side of the frame 16 extends to and is secured to the adjacent portion of the frame 11, while the other portion of the frame 16 is cut away as at 20. At this portion a roller 21, extending at an angle of substantially 45° from each conveyer unit, has one end rotatably journalled in a bracket 22, the other end being suitably journalled in a bracket (not shown) carried by the frame 11.

Carried by the container 14 is an apertured plate 25, the apertures 26 therein being disposed at predetermined spaced positions for receiving contacts 27, the latter having enlarged portions 28 to rest upon the upper surface of the plate 24. The contacts 27, when suitably positioned, will engage the spaced portions 29 and 30 of a selector element 31 to cause actuation of a mechanism to move a deflector arm 32 across the conveyer 10 to cause the container to move from the conveyer 10 onto the conveyer 15.

The selector element 31 is rotatably mounted on a shaft 35 resting upon a head portion 36 of the shaft and normally positioned, with the portions 29 and 30 lying in a plane transverse to the direction of travel of the container, by a spring 37, one end of which is fixed to the shaft 35 while the other end is connected to the selector element. The upper end of the shaft 35 is threadedly connected to a support 38 and locked against rotation by any suitable means such as pin 39. The support 38 is apertured to receive a shaft 40 upon which the support is mounted and locked in any desired position by a set screw 41.

Vertically extending brackets 42 and 43 rigidly mounted in any suitable manner on the frame 11 have bearing portions in their upper ends for rotatably supporting the shaft 40. One end of the shaft 40 has a lever 45 mounted thereon which extends downwardly and is pivotally connected, at its lower end, to a connecting rod 46. The lever 45 is normally urged clockwise by a spring 48 to return the selector element 31 and the deflector arm 32 to their normal positions when the deflector mechanism is released after deflecting the container from the conveyer 10 onto the conveyer 15. The forward or right end of the connecting rod 46 is reduced to form a shaft-like portion 50 projecting downwardly through a bearing in a lever 51, the latter being fixedly mounted upon the lower end of the shaft 52. The shaft 52 extends upwardly through a bearing bracket 53 which is rigidly mounted on the frame 11 and has its upper end disposed in and fixed to a lug 55 carried by the deflector arm 32.

The mechanism thus described connects the deflector arm 32 to the selector element 31 so that movement of the selector element to rotate the shaft 40 will cause movement of the deflector arm transversely across the conveyer 10, to a position back of a latch 58, after riding over a tapered surface 57 of the latch, where it will be held until the latch is released.

The latch 58 is fixed to a lever 59 and extends vertically through an aperture provided by slots in the adjacent portion of the frame 16 and a guide plate 60. The lever 59 is pivotally supported by a pivot pin 61 carried by a bracket 62, the latter being supported by the frame 11, and has an arm 63 extending downwardly to support a pin 64 to which a spring 65 is connected for normally urging the lever together with the latch upwardly. An arm 67 mounted upon the free end of the lever 59 supports a roller 68 at its upper end and at a position above the upper surface of the belt 18 so that it will be engaged by a container travelling on the rollers 17 to the belt.

Upon considering the operation of the mechanism described thus far, let it be assumed that the contacts 27 are properly positioned to engage the portions 29 and 30 of the selector element 31. As the container 14 moves in the direction of the arrow the contacts 27 will engage the portions 29 and 30 of the selector element and move the element counterclockwise to impart a similar movement to the shaft 40, and the lever 45. This movement of the lever 45 will cause the connecting rod 46, through the lever 51, to rotate the shaft 52 counterclockwise to swing the deflector arm 32 across the conveyer 10 until the free end of the deflector arm has travelled over the tapered surface 57 of the latch 58, causing the latch to move downwardly with the lever 59 about the pivot 61 and against the tension of the spring 65 until the free end of the deflector arm has moved past the latch, where it comes to rest and is held in this position by the latch, the latter having been freed to move upwardly by the force of the spring 65. Therefore, the movement of the container 14 carrying the properly positioned contacts 27 will cause actuation of the deflector mechanism as the container passes between the selector elements, thus automatically conditioning the deflector mechanism to deflect the container from the conveyer 10 onto the conveyer 15.

After the container 14 has passed a suitable distance on the conveyer 15 it travels over the roller 68, causing downward movement of the arm 67 to move the lever 59 about its pivot and against the tension of the spring 65 to move the latch 58 free of the deflector arm 32 and allow the spring 48 to return the deflector arm moving mechanism to its normal position, illustrated in Fig. 1, thus positioning the selector element to be engaged by contacts on containers which are to be transferred onto the conveyer 15.

The construction of the selector element 31 is such that either one of the contacts 27 may be disposed in a position to engage either projection 29 or 30 without causing operation of the deflector mechanism. Let it be assumed, for example, that the contact 27 in the second aperture is removed, leaving the contact in the fifth aperture to engage the projection 30. The contact which has been removed may be disposed in one of the remaining apertures to form a combination suitable for another selector element. The container 14 for movement toward the selector element on the conveyer 10 with the contacts thus arranged will move the contact in the fifth aperture in engagement with the projection 30 of the selector element, causing the element to rotate about the shaft 35 against the force of the spring 37 a sufficient distance to allow the said contact to move thereby, after which the spring 37 will return the selector element to its normal position. A similar action will take place when a contact is in the second aperture and the other contact is in another aperture other than the fifth, at which time the projection 29 will be engaged, moving the element in the opposite direction against the force of the spring. Therefore, unless the contacts 27 are at definite positions relative to the container the deflector mechanism will not be actuated and the same is true if less than the required number, this number in the present instance being two, of the contacts are disposed in the definite positions. In this manner the adjustment of the supports 38 at various positions throughout the control system which might have several conveyer units, such adjustment being made to locate the selector elements at desired positions so that the projections 29 and 30 will be engaged by contacts 27 when disposed at definite locations relative to the container to actuate only the desired deflector mechanism or mechanisms for guiding a container to a definite station.

The length of the projections 29 and 30 may be varied with variations in the length of the contacts 27 so that a greater number of combinations may be formed; for example, with three different lengths of projections 29 and 30 and similar contacts therefor ninety different combinations may be formed.

At certain times it is desirable to stop containers at definite locations on the conveyers so that an operator may move the container at that point. This may be accomplished by inserting a pin 70 in aligned apertures in the lever 45 and the bracket 43 to lock the deflector mechanism against actuation. Therefore, if the contacts 27 are disposed in the definite apertures or positions to engage the projections 29 and 30 at this position the container will be stopped on the conveyer. Such mechanism is also desirable when the branch conveyer units such as 15 have become filled with containers, thus holding the containers on the conveyer 10 until those in conveyer 15 have been removed. This means is also illustrated in Fig. 3 and is capable of stopping the containers at desired positions other than the adjacent juncture of the conveyer units. This mechanism consists of brackets 72 and 73, similar to the brackets 42 and 43, rigidly secured to a frame 75 of a conveyer 76 and rotatably supporting, at their upper ends, a shaft 77. A support 78, identical with the support 38, is adjustably located upon shaft 77 and held in place by set screw 79. A shaft 80, carried by a support, has a selector element 81 rotatably disposed therein and normally held in a position transverse to the conveyer by a spring 82. A lever 83 mounted upon one end of the shaft 77, has an aperture in the lower end thereof for receiving a pin 84, the latter being receivable in an aperture in the bracket 73, to lock the lever against movement. Therefore, with this structure it is possible, by the insertion of the pin 84 in the aperture of the lever 83 and the bracket 73, to hold the selector element 81 against movement and thus stop a container having the contacts 27 disposed at definite positions against movement on the conveyer 76.

The embodiments of the invention herein disclosed are illustrative only and may be widely modified and departed from in many ways without departing from the spirit and scope of the invention as pointed out in and limited only by the appended claims.

What is claimed is:

1. A conveyer system comprising a deflecting mechanism including a deflector movable between a normal position and a deflecting position, a rock shaft operatively connected to the deflecter, an arm projecting from the rock shaft, and a selector pivotally supported by the arm and having projections disposed at opposite sides of the arm to cause movement of the arm and the shaft to move the deflector into its deflecting position when a plurality of the projections is engaged by a moving object.

2. A conveyer system comprising a deflecting mechanism including a deflector movable between a normal position and a deflecting position, a rock shaft operatively connected to the deflector, an arm projecting from the rock shaft, and a selector pivotally supported by the arm and having projections disposed at opposite sides of the arm to cause movement of the arm and the shaft to move the deflector into its deflecting position when a plurality of the projections is engaged by a moving object but pivoted on the arm when only one projection is engaged by a moving object.

3. A conveyer system comprising a deflecting mechanism including a deflector movable between a normal position and a deflecting position, a rock shaft operatively connected to the deflector, an arm projecting from the rock shaft, and a selector pivotally supported by the arm and having projections disposed at opposite sides of the arm to cause movement of the arm and the shaft to move the deflector into its deflecting position when a plurality of the projections is engaged by a moving object but pivoted on the arm when any one projection is engaged by a moving object.

4. A conveyer system comprising a deflecting mechanism including a deflector movable between a normal position and a deflecting position, a rock shaft operatively connected to the deflector, an arm projecting from the rock shaft, a selector pivotally supported by the arm and having projections disposed at opposite sides of the arm to cause movement of the arm and the shaft to move the deflector into its deflecting position when a plurality of the projections is engaged by a moving object, and means to normally hold the selector to position the projections in a plane transverse to a path of the moving object.

5. A conveyer system comprising a deflecting mechanism including a deflector movable between a normal position and a deflecting position, a rock shaft operatively connected to the deflector, an arm projecting from the rock shaft, a selector pivotally supported by the arm and having projections disposed at opposite sides of the arm to cause movement of the arm and the shaft to move the deflector into its deflecting position when a plurality of the projections is engaged by a moving object but pivotally moved in either direction on the arm when any one projection is engaged by a moving object, and means to return the selector to a normal position after pivotal movement in either direction.

6. A conveyer system comprising a deflecting mechanism including a deflector movable between a normal position and a deflecting position, a rock shaft operatively connected to the deflector, an arm projecting from the rock shaft, a selector pivotally supported by the arm and having projections disposed at opposite sides of the arm to cause movement of the arm and the shaft to move the deflector into its deflecting position when a plurality of the projections is engaged by a moving object, and means to secure the arm to the shaft at selected variable positions to vary the position of the selector relative to the path of the object.

DONALD H. MITCHELL.